United States Patent [19]

Tyler et al.

[11] 4,232,737
[45] Nov. 11, 1980

[54] DOUBLE TAPERED SURFACTANT WATERFLOOD OIL RECOVERY PROCESS

[75] Inventors: Timothy N. Tyler; Joseph T. Carlin, both of Houston, Tex.

[73] Assignee: Texaco Inc., White Plains, N.Y.

[21] Appl. No.: 97,470

[22] Filed: Nov. 26, 1979

[51] Int. Cl.³ .............................................. E21B 43/22
[52] U.S. Cl. ....................................... 166/273; 166/274
[58] Field of Search ......................... 166/273, 274, 275

[56] References Cited

U.S. PATENT DOCUMENTS

| | | | |
|---|---|---|---|
| 3,266,570 | 8/1966 | Gogarty | 166/273 |
| 3,330,343 | 7/1967 | Tosch et al. | 166/274 X |
| 3,346,047 | 10/1967 | Townsend et al. | 166/273 |
| 3,500,924 | 3/1970 | Poettmann | 166/273 X |
| 4,008,769 | 2/1977 | Chang | 166/274 |
| 4,018,278 | 4/1977 | Shupe | 166/252 |
| 4,042,030 | 8/1977 | Savins et al. | 166/273 |
| 4,066,124 | 1/1978 | Carlin et al. | 166/273 X |
| 4,099,569 | 7/1978 | Bousaid | 166/273 |
| 4,181,178 | 1/1980 | Savins | 166/274 |

Primary Examiner—Stephen J. Novosad
Assistant Examiner—George A. Suchfield
Attorney, Agent, or Firm—Carl G. Ries; Robert A. Kulason; Jack H. Park

[57] ABSTRACT

Disclosed is an oil recovery process for recovering oil from subterranean formations containing relatively high salinity water, said process employing an aqueous surfactant fluid containing at least two surfactants, one primary anionic surfactant such as petroleum sulfonate and a solubilizing cosurfactant such as an alkyl or alkylaryl, polyethoxy sulfate or sulfonate. The process comprises injecting a plurality of slugs of surfactant fluids followed by a low salinity fluid containing a viscosifying amount of a hydrophilic polymer. The salinity and concentration of solubilizing cosurfactant of each surfactant slug are both decreased from the maximum level in the first slug of the surfactant fluid and in successive slugs to a minimum level at the last slug of the surfactant fluid.

11 Claims, 1 Drawing Figure

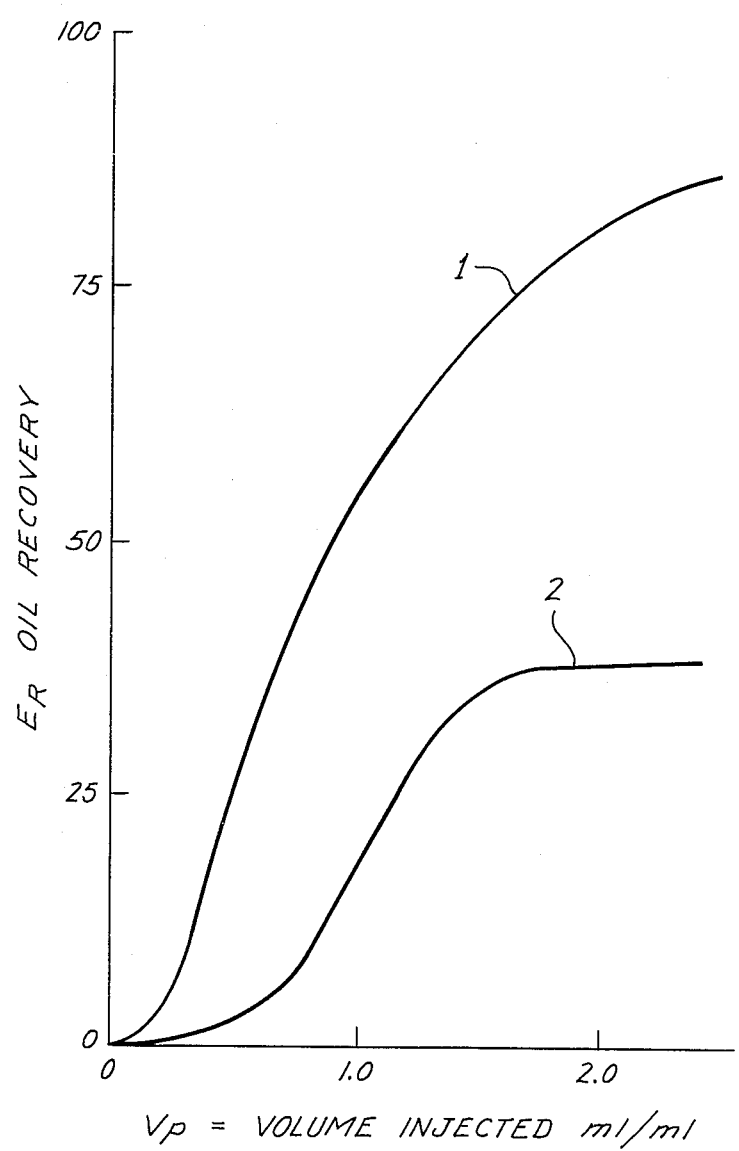

DOUBLE TAPERED SURFACTANT WATERFLOOD OIL RECOVERY PROCESS

FIELD OF THE INVENTION

This invention concerns a process for enhanced oil recovery, and more particularly it pertains to an improved surfactant waterflooding enhanced oil recovery process.

BACKGROUND OF THE INVENTION

It is well recognized by persons skilled in the art of oil recovery techniques that only a fraction of the amount of petroleum or oil initially present in the petroleum reservoir is recovered by primary recovery methods, e.g. by pumping or allowing the oil to flow to the surface of the earth as a consequence of naturally occuring energy forces, or even when secondary recovery processes such as waterflooding are employed. Although waterflooding is an inexpensive and commercially successful enhanced oil recovery process, water does not displace oil efficiently even in those portions of the formation through which it passes, because water and oil are immiscible and the interfacial tension between water and oil is quite high. This reason for the failure of waterflooding to recover all or even a substantial portion of the oil remaining in the formation after primary recovery operations have been terminated has also been recognized by persons skilled in the art of enhanced oil recovery, and many literature references suggest the incorporation of a variety of surface active agents (e.g., surfactants) in the flood water, for the purpose of reducing the interfacial tension between the injected aqueous fluid and the formation petroleum, which accomplishes an increase in the amount of oil displaced by the injected fluid. Petroleum sulfonates have been suggested in many references and have been employed in field trials of surfactant waterflooding oil recovery process, with varying degrees of success, although petroleum sulfonates can only be used without additional surfactants in formations containing relatively low salinity water, e.g. formations containing water whose salinity is less than about 20,000 parts per million total dissolved solids.

It is also well recognized that other types of surfactants may be used alone or in combination with pertroleum sulfonates and high salinity water-containing formations. Alkylpolyethoxy sulfates or alkylarylpolyethoxy sulfates may be used alone or as a solubilizing co-surfactant for petroleum sulfonate in high salinity water-containing formations so long as the formation temperature is less than about 175° F. (79.4° C.), but the ethoxy sulfates cannot be used in higher temperature formations because of their tendency to hydrolyze, and the rate of hydrolysis increases with increased temperature. It is also known in the art to employ either alone or in combination with petroleum sulfonates, alkylpolyethoxyalkylene sulfonates or alkylarylpolyethoxyalkylene sulfonates, which are very tolerant of high salinity of water and very stable at elevated temperatures, considerably higher than the ethoxy sulfates surfactants.

Despite the encouraging results which have been reported in the literature employing the above-described combination processes in high salinity water-containing oil formations, the actual experience to date in field trials employing these processes have been disappointing for a variety of reasons. Adsorption of the salinity-tolerant surfactants is a serious problem, which increases the cost of the fluid and decreases the effectiveness of the oil recovery process. The amount of oil recovered in many instances has been substantially less than originally expected, based on laboratory experiments, and this is at least in part related to the above-described phenomena of surfactant loss from the fluid to the formation. Another problem has been encountered in times, in an adverse interaction between the ethoxy sulfates or ethoxy sulfonates and certain hydrophilic polymeric materials such as polyacrylamide or polysaccharides commonly injected subsequent to the injection of the surfactant fluid, for the purpose of insuring a favorable mobility ratio between the injected fluid and the displaced fluids. Moreover, optimum hydrophilic polymer performance is achieved in relatively low salinity environments, but contact between low salinity polymer fluids and high salinity surfactant fluids degrades the effectiveness of a surfactant combination which is tailored to produce optimum results in high salinity environments, and so the interaction between the high salinity surfactant fluid and the low salinity polymer fluid causes some degradation of both polymer effectiveness and surfactant effectiveness.

In view of the foregoing discussion, and the current serious petroleum shortage which could be significantly alleviated with an effective enhanced oil recovery process, it can be appreciated that there is a significant commercial need for an economical surfactant waterflooding enhanced oil recovery process suitable for use in high salinity environments, which avoid at least certain of the aforementioned disadvantages encountered using surfactant waterflooding processes as are now practiced.

PRIOR ART

U.S. Pat. Nos. 4,066,124 and 4,110,228 describe oil recovery processes and methods for selecting the optimum ethoxylated and sulfonated or ethoxylated and sulfated surfactant for use in combination with petroleum sulfonate, and also for selecting the optimum ratio of soliblizing co-surfactant to primary anionic organic sulfonate surfactant, for any particular salinity environment in which the surfactants are to be employed.

U.S. Pat. No. 4,018,278 teaches an oil recovery process employing an ethoxylated and sulfonated surfactant in single surfactant form. U.S. Pat. No. 3,827,497 describes an oil recovery process using an ethoxylated and sulfonated surfactant in combination with an organic sulfonate including petroleum sulfonate. U.S. Pat. No. 3,508,612 describes an oil recovery process employing an ethoxylated and sulfated surfactant in combination with petroleum sulfonate.

SUMMARY OF THE INVENTION

We have discovered an improved surfactant waterflooding enhanced oil recovery process which is especially useful for recovering oil from subterranean formations containing high salinity water. The process employs an aqueous fluid containing at least one primary anionic surfactant, preferably petroleum sulfonate having a median equivalent weight of the range from about 350 to about 450, and an amount of a solubilizing co-surfactant sufficient to render the primary anionic surfactant at least slightly soluble in the saline fluid in which it is formulated. The preferred solubilizing co-surfactants include ethoxylated and sulfonated surfactants having the following formula:

$$RO(R'O)_nR''SO_3^-X^+$$

wherein R is a $C_8$ to $C_{22}$ and preferably $C_{12}$ to $C_{18}$ alkyl or an alkylaryl such as benzene toluene or zylene having attached thereto at least one $C_6$ to $C_{18}$ and preferably $C_8$ to $C_{15}$ alkyl group, R' is ethylene or a mixture of ethylene and propylene or other higher alkylene with relatively more ethylene than higher alkylene, n is a number representing the average number of alkylene oxide units, R'' is ethylene, propylene, hydroxypropylene or butylene, S is sulfur, O is oxygen, and X is a monovalent cation, preferably sodium, potassium, lithium or ammonium.

Another preferred surfactant is an ethoxylated and sulfated surfactant having the formula:

$$RO(R'O)_nSO_3^-M^+$$

wherein R, O, R', n, S and M have the same meaning as above.

The leading edge, or first portion of the surfactant fluid injected into the formation, ordinarily has a salinity from 50 to 150 and preferably 90 to 110 percent of the salinity of the water present in the flow channels of the formation into which it is injected. The ratio of solubilizing co-surfactant to primary anionic surfactant for this portion of the surfactant fluid is carefully chosen so as to render the surfactants at least slightly soluble in this salinity fluid. The salinity and the concentration of solubilizing co-surfactant are both decreased, either step wise through a plurality of mini-slugs of surfactant fluid, or in an even tapered fashion, from this initial high salinity, high concentration of solubilizing co-surfactant, to a value at the trailing edge of the surfactant fluid which is substantially less than the leading edge. The surfactant fluid is ordinarily followed by an aqueous fluid containing a viscosifying amount of a hydrophilic polymer, which is preferably formulated in relatively low salinity environment, e.g. salinity in the range of from 200 to 50,000 and preferably from 200 to 20,000 parts per million total dissolved solids. The salinity of the trailing edge of the surfactant fluid should be about the same as the salinity of the polymer fluid, preferably from 75% to 300% of the polymer fluid salinity, with the amount of solubilizing co-surfactant reduced sufficiently to render the petroleum sulfonate in that portion of the total surfactant fluid at least slightly soluble at that salinity. If the salinity and concentration of solubilizing co-surfactant are reduced in step wise fashion, the number of steps involved should be from 2 to 10 and preferably 2 to 5, with the larger number of reduction steps being used in applications to petroleum formations having high salinities.

BRIEF DESCRIPTION OF THE DRAWING

The attached drawing illustrates graphically the enhanced oil recovery versus pore volumes of fluid injected for a conventional, single slug surfactant waterflood compared to a double tapered process according to our invention.

DESCRIPTION OF THE PREFERRED EMBODIMENTS

Briefly, the process of our invention is an improvement in a surfactant waterflooding enhanced oil recovery process, particularly a process used in an oil formation containing high salinity water. The process will employ at least two surfactants:

1. A primary anionic surfactant, preferably an organic sulfonate. Petroleum sulfonate is a particularly preferred organic sulfonate, because of its low-cost, effectiveness, and wide spread availability. The particularly preferred petroleum sulfonate is one being comprised of a broad spectrum of molecular species differing in equivalent weight over a range from 200 to 700 and having a median equivalent weight in the range from about 325 to about 475 and preferably from about 350 to about 450. $C_{10}$ to $C_{35}$ alkyl or alkylaryl sulfonates are also suitable organic sulfonates for this application. Combinations of the foregoing may also be used.

2. A solubilizing co-surfactant should be used in at least a portion of the surfactant fluid, in order to render the above-described primary anionic surfactant at least slightly soluble in that fluid. The amount of solubilizing co-surfactant necessary to accomplish solubilization of the organic sulfonate primary anionic surfactant is largely determined by the salinity of the fluid in which the surfactants are dissolved.

The solubilizing co-surfactant employed in our process is a surfactant which is ethoxylated and sulfated or ethoxylated and sulfonated, and has one of the two following formulas:

$$RO(R'O)_nR''SO_3^-X^+ \quad \text{(ethoxy sulfonate)} \tag{1}$$

wherein R is a $C_8$ to $C_{22}$ and preferably $C_{12}$ to $C_{18}$ alkyl, linear or branched, or alkylaryl group such as benzene, toluene or xylene having attached thereto at least one $C_6$ to $C_{18}$ and preferably $C_8$ to $C_{15}$ alkyl group, linear or branched, R' is ethylene or a mixture of ethylene and propylene or other higher alkylene with relatively more ethylene than higher alkylene, n is a number from 2 to 12 representing the average number of alkylene oxide units, R'' is ethylene, propylene, hydroxypropylene or butylene, S is sulfur, O is oxygen, and X is a monovalent cation, preferably sodium, potassium, lithium, or ammonium.

$$RO(R'O)_n(SO_3^-X^+ \quad \text{(ethoxy sulfate)} \tag{2}$$

wherein R, O, R', n, S and X have the same definiations as above.

In the second formula, the surfactant is an alkylpolyalkoxy sulfate or alkylarylpolyalkoxy sulfate surfactant. This is a preferred surfactant for use in high salinity environments, e.g. in formations containing water having salinities in the range from 20,000 parts per million total dissolved solids up to as high as 240,000 parts per million total dissolved solids, so long as the formation temperature is less than about 175° F. (79.4° C.), since the ethoxylated and sulfated surfactants are prone to hydrolyze at a rate which increases with increased temperature. The surfactants are the preferred surfactants in low temperature formations mainly because they are less expensive and more readily available than the ethoxy sulfonate surfactants.

If the formation temperature exceeds about 175° F., the preferred solubilizing co-surfactant for use in our process is the ethoxy sulfonates, e.g. alkylpolyalkoxyalkylene sulfonate or alkylarylpolyalkoxyalkylene sulfonate of formula (1). In this instance, R'' in the first formula is ethylene, propylene, hydroxypropylene or butylene. These surfactants are quite suitable for use in high salinity water-containing formations and resistant to hydrolysis or other degradation at elevated temperatures, and may be used in formations whose temperature is as high as 350° F. (175° C.).

Many prior art references teach oil recovery processes using an aqueous saline fluid containing the above-described combinations of surfactants, and further teach how the optimum solubilizing co-surfactant is selected for a particular application, and further how the optimum ratio solubilizing co-surfactant to primary anionic surfactant is selected. Briefly, the methods comprise identifying the solubilizing co-surfactants which form phase stable, low surface tension aqueous fluids with petroleum sulfonates at the salinity of the formation into which the fluids are to be injected. The minimum amount of solubilizer which just accomplishes solubilization of petroleum sulfonate may be identified by direct observation of the system, e.g. observing the amount of solubilizing co-surfactant which accomplishes irradication of the undissolved petroleum sulfonate phase in a saline solution using the surfactants being investigated, or by identifying the ratio of solubilizing co-surfactant to primary anionic surfactant which produces a fluid having a minimum electrical conductivity. Another method comprises identifying the ratio of solubilizing co-surfactant to primary anionics surfactant which produces a fluid having a particular characteristic appearance associated with the fluid having surfactants at a condition of borderline solubility. The end point appearance is a pearlescence or silver swirl appearance, which is easily detected by visual observation of the fluids.

The essence of our invention is concerned with the particular way in which the saline, surfactant-containing fluid is formulated and injected into the formation. The method described in most prior art references comprises formulating essentially a single, uniform slug of surfactant, which is injected into the formation, with the salinity and concentration of all of the surfactant components of the slug being held uniform from the leading edge to the trailing edge thereof. We have discovered a significant improvement is attained if both the salinity of the slug and the concentration of the solubilizing co-surfactant are decreased in a uniform fashion from a maximum value at the leading edge to a minimum value at the trailing edge of the surfactant fluid. This may be accomplished in two basic ways. In one method, the salinity is decreased in a continuous, gradual fashion from the value of the leading edge to the value at the trailing edge. At all times, the concentration of solubilizing co-surfactant is maintained at a level which is at least sufficient to achieve borderline solubility of the primary anionic surfactant in the aqueous fluid at the salinity being injected at that particular time.

Another method for formulating and injecting the fluid according to the process of our invention, involves formulating a plurality of discrete mini-slugs of surfactant with the first mini-slug having the maximum salinity and corresponding maximum concentration of solubilizing co-surfactant, and each succeeding slug having less salinity and less solubilizing co-surfactant. When this method is employed, the decrease in salinity should be in a relatively equal step fashion, from the salinity of the first slug to the salinity of the last slug, and the salinity of the last slug is the minimum salinity of any of the slugs injected, and ordinarily is about equal to the salinity of the polymer fluid which is injected next after completion of injecting the last surfactant slug. The salinity of the final surfactant fluid slug or trailing edge of the surfactant fluid should be from 75 to 300 and preferably from 100 to 150 percent of the salinity of the polymer fluid. When this technique comprising injecting a plurality of separate slugs with steadily declining salinity and decreasing concentration of solubilizing co-surfactant is employed, the number of slugs is determined generally by the salinity of the first slug, which in turn is determined by the salinity of the water present in the formation into which the surfactant fluid is injected. For example, if the salinity of the formation present in the flow channels of the formation is in the range of about 100,000 parts per million total dissolved solids, then the optimum number of slugs is in the range from 2 to 10 and preferably from 2 to 5. If the salinity of the water present in the flow channels of the formation is about 200,000 parts per million, then the optimum number of slugs is from 2 to 10 and preferably from 4 to 7. Although this embodiment of our invention requires the formulation of a large number of slugs, it is not a difficult method for applying the process of our invention, and will not substantially increase the complexity of applying the process of the field since one commonly employed method of preparing a large quantity of surfactant fluid for injection in a formation requires the preparation of a plurality of separate batches, dictated by the volume of mixing equipment available on the surface. Whereas in conventional practice, each of these batches will have identical salinity and surfactant composition, in applying the process of this invention, the fluid salinity and concentration of the solubilizing co-surfactant will both be decreased with each successive slug of surfactant fluid formulated and injected into the formation.

Ordinarily the first quantity of surfactant fluid injected into the formation is an aqueous fluid having salinity about equal to the salinity of the water present in the formation. This is the fluid ordinarily available for testing, and recommended procedure for applying this process contemplates that laboratory tests be performed employing this salinity fluid to determine the optimum solubilizing co-surfactant, and the concentration thereof which will accomplish borderline solubility of the petroleum sulfonate at that salinity.

The salinity of the last quantity of surfactant fluid injected into the formation is ordinarily about equal to the salinity of the polymer containing fluid which will be injected next. Most of the hydrophilic, viscosity increasing polymers employed in oil recovery activities produce optimum results at salinities which are relatively low compared to salinities ordinarily encountered in petroleum formations. Specifically, the preferred salinity for the hydrophilic polymer is in the range of from 200 to 50,000 and preferably 200 to 20,000 parts per million total dissolved solids. The divalent ion concentration, e.g. the concentration of calcium and magnesium, should be below 1000 and preferably below 200 parts per million. In the especially preferred embodiment of our process, the salinity of the surfactant fluid injected just prior to the hydrophilic polymer is of about the same salinity. Although slightly higher or lower salinities may be tolerated, the reason for recommending that the salinity be matched between the hydrophilic polymer fluid and the surfactant fluid at the trailing edge, relates to the mixing which ordinarily is accomplished between the trailing edge of one fluid and the leading edge of a fluid injected immediately thereafter. If there is a significant difference in salinity, then the salinity of the mixture formed by the trailing edge of the surfactant fluid and leading edge to the polymer fluid will be too low for optimum surfactant oil recovery effectiveness, and too great for optimum mobility ratio performance by the polymer.

Ordinarily the concentration of the primary anionic surfactant, e.g. the organic sulfonate, which is usually petroleum sulfonate, will be held constant throughout the course of injecting the total quantity of surfactant-containing fluid into the formation. This is not an absolute requirement, but it is a convenience which simplifies designing the system and formulating the surfactants.

Each intervening mini-slug of surfactant injected between the initial, maximum salinity and maximum solubilizing co-surfactant containing slug, and the trailing slug which is the minimum salinity and minimum solubilizing co-surfactant concentration containing slug, is formulated as follows. The salinity should be decreased in a more or less linear fashion through successive steps from the maximum to the minimum value. The concentration of petroleum sulfonate or other primary anionic surfactant is held constant, as described above. The amount of solubilizing co-surfactant which just effectively solubilizes the petroleum sulfonate at the salinity of each particular slug, is then determined and this is the minimum quantity of solubilizing co-surfactant added to each slug as it is formulated and injected into the formation. Thus each slug contains petroleum sulfonate and just enough solubilizing co-surfactant to render the petroleum sulfonate borderline soluble at the salinity of that mini-slug of surfactant. Thus each slug will differ from the one injected just before it and the one injected just after it, both in salinity and concentration of solubilizing co-surfactant.

The method applying the process of our invention will be more fully understood by reference to the following experimental examples.

EXPERIMENTAL SECTION

A series of laboratory experiments involving displacement of petroleum from cores using surfactant fluids were performed in the course of attempting to identify a potential process for application in a field under study, which field contained water having salinity of 115,000 parts per million total dissolved solids including 6000 parts per million divalent ions. The salinity of the water present in this formation was too great to permit using petroleum sulfonate alone, since it is insoluble and ineffective at salinities this high. Laboratory tests indicated that petroleum sulfonates could be solubilized under these salinity conditions using around 1% of a nonyl benzene pentaethoxyethylene sulfonate, sodium salt. Other experiments also indicated superior results were obtained if the surfactant fluid contained a small amount of a polyacrylamide polymer. The amount of the above-described nonylbenzene pentaethoxyethylene sulfonate required to solubilize 2% of petroleum sulfonate varied, of course, with the salinity of the fluid composition, from 1.05% at a salinity value of 115,000 parts per million, to 0.85% at a salinity of 92,000 parts per million, down to 0.16% at a salinity of 23,000 parts per million total dissolved solids. The first run, Run A, involved injecting five separate mini-slugs of surfactant with salinity varying from 115,000 parts per million total dissolved solids, about equal to the salinity of the water present in this formation, down to 23,000 parts per million total dissolved solids which was about 20% of the salinity of the water present in this formation. The volume and composition of the slugs as shown in Table I below. The petroleum sulfonate employed in Run A was S-137, a commercially available petroleum sulfonate having a media equivalent of about 400. All of the surfactant fluids described in this series of tests contain 0.05% Q41F, a polyacrylamide polymer produced by Nalco Chemical Company.

Run B was performed using five separate slugs, each of which contain 2% of a mixture of TRS-18 and TRS-40, commercially available petroleum sulfonates produced by Witco Chemical Company, the two materials being blended to produce a mixture having an average equivalent weight of 375. The amount of nonylbenzene pentaethoxyethylene sulfonate required to solubilize this petroleum sulfonate in the high salinity environment in which these tests were conducted was somewhat less than in Run A, illustrating the effect that the choice of petroleum sulfonate has on the amount of solubilizer required for the test. All of the surfactant fluids used in Run B also contain 0.05% Q41F, the polyacrylamide sold by Nalco Chemical Company. The salinity of these slugs varied from 115,000 parts per million down to 23,000 parts per million, with approximately equal reductions in salinity through the five slugs prepared. The composition and salinity of these slugs is also shown in Table I below.

For a comparison, a single slug oil recovery test using the blend of TRS 18 and TRS 40 together with nonylbenzenepentaethoxyethylene sulfonate in water having salinity of 115,000 parts per million was conducted. The same materials and the same procedures were used in Run C as in the previous runs, and about the same total volume of surfactant was employed, except a single slug was injected of uniform salinity and surfactant composition. Whereas the total pore volume of slug injected was slightly less in Run C than in Runs A or B, the amount of the more expensive component, the solubilizing co-surfactant was greater in Run C than in the total of Runs A or B because the concentration of solubilizing co-surfactant was reduced substantially in Runs A and B in each of the mini-slugs after the first slug of surfactant injection.

TABLE I
FORMULATION OF SURFACTANT MINI SLUGS

| Run | Mini Slug | $V_p{}^1$ | % P.S.[2] | % S.C.S[5] | % Polymer | Salinity |
|---|---|---|---|---|---|---|
| A | 1 | 0.11 | 2.0 S[3] | 1.05 | .05 Q[6] | 115,000 |
|  | 2 | 0.10 | 2.0 S[3] | 0.85 | .05 Q | 92,000 |
|  | 3 | 0.15 | 2.0 S[3] | 0.58 | .05 Q | 69,000 |
|  | 4 | 0.09 | 2.0 S[3] | 0.39 | .05 Q | 46,000 |
|  | 5 | 0.10 | 2.0 S[3] | 0.16 | .05 Q | 23,000 |
|  | 6 | — | — | — | 1000 ppm K[7] | <1,000 |
|  | 7 | (Brine) | — | — | — | 115,000 |
|  | 8 | (Tap water) | — | — | — | <1,000 |
| B | 1 | 0.11 | 2.0 T[4] | 0.58 | .05 Q[6] | 115,000 |
|  | 2 | 0.10 | 2.0 T[4] | 0.54 | .05 Q[6] | 92,000 |
|  | 3 | 0.12 | 2.0 T[4] | 0.50 | .05 Q[6] | 69,000 |
|  | 4 | 0.11 | 2.0 T[4] | 0.43 | .05 Q[6] | 46,000 |
|  | 5 | 0.11 | 2.0 T[4] | 0.19 | .05 Q[6] | 23,000 |
|  | 6 | — | — | — | 1000 ppm K[7] | <1,000 |
|  | 7 | (Brine) | — | — | — | 115,000 |
|  | 8 | (Tap water) | — | — | — | <1,000 |
| C | 1 | 0.50 | 2.0 T | 0.50 | .05 Q | 115,000 |
|  | 2 | — | — | — | 1000 ppm K | <1,000 |
|  | 3 | (Brine) (Tap | — | — | — | 115,000 |

TABLE I-continued

FORMULATION OF SURFACTANT MINI SLUGS

| Run | Mini Slug | $V_p^1$ | % P.S.[2] | % S.C.S[5] | % Polymer | Salinity |
|---|---|---|---|---|---|---|
| | 4 | water) | — | — | — | <1,000 |

[1] $V_p$ = pore volume
[2] P.S. = petroleum sulfonate.
[3] S = Stepan Chemical Co. S-137 ® petroleum sulfonate, median equivalent weight of 385.
[4] T = Blend of Witco Chemical Co. TRS 18 ® and TRS 40 ® blend median equivalent weight = 375.
[5] SC5 solubilizing co-surfactant-sodium nonylbenzenepentaethoxyethylene sulfonate.
[6] Q = Nalco Chemical Co. Q41F ® brand of polyacrylamide.
[7] K = Kelzan ® biopolymer sold by Kelco.

In one set of tests surfactant fluid was flowed through a Salem Benoist core and a Walpole Aux Vases sandstone core and followed by fresh water drive in each case, with the effluent being analyzed to determine to the surfactant content. It was determined that surfactant was adsorbed from the fluid passing through the core, and was released from the core so it may be produced in the effluent in significant quantities only after fresh water injection is initiated into the core. The surfactant released by passage of a quantity of fresh water through the core can displace additional oil from the core, and significant increases in the total oil recovery have been achieved by simply following a saline surfactant slug with fresh water. When the surfactant system employed is designed to produce optimum lowering of interfacial tension at a high brine environment, however, the dilution of the system of fresh water causes a rapid increase in interfacial tension. Thus the surfactant systems (i.e. mixtures of petroleum sulfonate and solubilizing co-surfactant such as ethoxy sulfates or ethoxy sulfonates), while absorbed from the formation, and while subsequent passage of fresh water through the core causes surfactant to be released, the desorbed surfactant is not effective for recovering oil since the system does not achieve effective reduction in interfacial tension under low salinity conditions.

Core flood were performed using the systems whose composition is detailed in Table I, and the oil recovery efficiency was determined as a function of pore volumes of fluid injected. The results are shown in Table II below.

TABLE II

| Slug $V_p(m^3/m^3)$ | Er (Recovery Efficiency $m^3/m^3$) at different pore volumes throughput | | |
|---|---|---|---|
| | 0.8 | 1.6 | 2.4 |
| A | .28 | .61 | .64 |
| B | .24 | .50 | .58 |
| C | .12 | .35 | .36 |

It can be seen from the above data that slugs A and B, formulated according to the teachings of the process of our invention, recovered significantly more oil than the conventional method designated as flood C, which was performed according to methods described in the prior art with a single surfactant slug of uniform salinity and concentration of solubilizing co-surfactant. This clearly demonstrates the significant increase in the amount of enhanced oil recovery obtainable when the salinity and concentration of solubilizing co-surfactant are both decreased through a plurality of mini-slugs from the leading edge condition in which the concentration of solubilizing co-surfactant is adjusted to achieve a condition of borderline solubility at the salinity of the water present in the formation, to the trailing edge salinity condition which more nearly approximates the relatively fresh water environment in which optimum polymer performance is accomplished.

A series of experiments were performed to determine the minimum amount of solubilizing co-surfactant (nonylbenzenehexaethoxyethylene sulfonate) required to solubilize a blend of TRS 18 and TRS 40 petroleum sulfonate, studying the changes in amount of solubilizer required as the equivalent weight of the petroleum sulfonate blend is varied, and as the salinity of the fluid changes. The data are reported in Table III below.

TABLE III

MINIMUM CONCENTRATION OF NONYLBENZENEHEXAETHOXYETHYLENE SULFONATE TO SOLUBILIZE 2% PETROLEUM SULFONATE

| Average Equivalent Weight of Petroleum Sulfonate | SALINITY, parts per million | | | | |
|---|---|---|---|---|---|
| | 23,000 | 46,000 | 69,000 | 92,000 | 115,000 |
| 360 | 0.2 | .42 | .46 | .47 | .47 |
| 380 | 0.19 | .33 | .40 | .45 | .52 |
| 400 | 0.18 | .35 | .52 | .66 | .80 |
| 420 | 0.54 | .74 | .96 | 1.15 | 1.35 |
| 440 | 0.92 | .92 | 1.42 | 1.65 | 1.90 |

It can be seen from the data contained above that the minimum amount of solubilizing co-surfactant at any salinity corresponds to petroleum sulfonate equivalent weight in the range of about 380 to about 390. It can also be seen from the above table how the salinity of the fluid influences the amount of solubilizing co-surfactant, and when the petroleum sulfonate, for example, has an average equivalent weight of about 380, the amount of solubilizing co-surfactant varies from about 0.19 at a salinity of about 23,000 parts per million to about 0.52 and a salinity of about 115,000 parts per million total dissolved solids.

Another laboratory test was performed in a long core (44 cm. long) using the process of our invention as described above, with pressure measurements being made as well as enhanced oil recovery, both as a function of pore volumes of fluid injected. Pressure measurements were conducted to determine whether the integrity of the sequentially injected surfactant slugs was maintained. No significant discontinuities were observed, confirming that slug integrity was maintained. The final oil recovery was 84 percent, which is considered excellent recovery. The total pore volume of surfactant fluid employed in this test was 0.25 pore volumes, injected in the form of five double tapered mini-slugs.

Another series of experiments were performed illustrating the relative performance of an optimized oil recovery test according to our invention, and for comparison an optimized single uniform slug run conducted according to prior art teachings. Except for the use of a plurality of mini-slugs, with uniformly decreased salinity and solubilizer concentration, the two runs were identical. The surfactant fluid volume was about 0.25 pore volumes, and the petroleum sulfonate concentrate was 4 percent. The salinity of the run conducted with constant salinity and solubilizer concentration was 115,000 parts per million, and the solubilizer, which w/v concentration was 1.68 percent. In the double tapered multi-slug process, the first slug salinity and solubilizer concentration was as given above, with the salinity and solubilizer concentration both decreased through the 5 slugs to a final salinity of 23,000 parts per million and a final solubilizer concentration of 0.36 percent. Curve 1 of the attached figure illustrates the enhanced recovery results, which had a final value of about 84+ percent, compared to the prior art method, shown as Curve 2, which recovered only 38% of the oil. This is considered a very significant improvement.

While our invention has been described in terms of a number of illustrative embodiments, it is clearly not so limited and many variations thereof will be apparent to persons skilled in the art of enhanced oil recovery without departing from the true spirit and scope of our invention. Similarly, while discussions are contained in the foregoing disclosure for the purpose of explaining the mechanism believed to be responsible for the benefits observed in testing the process of our invention, this is not necessarily meant to imply that these are the only or even the principal mechanisms responsible, and we do not wish to be bound by any particular explanation as to why the results reported above are achieved using our process. It is our desire and intention that our invention be limited and restricted only by those limitation and restrictions appearing in the claims appended immediately hereinafter below.

We claim:

1. In a method of recovering petroleum from a subterranean, petroleum-containing formation, said formation being penetrated by at least one injection well and by at least one spaced-apart production well, both wells being in fluid communication with the formation, said formation containing water of known or determinable salinity greater than 20,000 parts per million total dissolved solids, comprising injecting an aqueous, saline surfactant-containing fluid into the formation, said fluid containing at least one primary anionic surfactant comprising an organic sulfonate and at least one solubilizing co-surfactant selected from the group consisting of alkylpolyethoxy sulfates, alkylarylpolyethoxy sulfates, alkypolyalkoxyalkylene sulfonates, alkylarylpolyalkoxyalkylene sulfonates, and mixtures thereof, and following said surfactant fluid with an aqueous fluid containing a viscosifying amount of a hydrophilic polymer, the salinity of the polymer-containing fluid being less than 50,000 parts per million total dissolved solids, wherein the improvement comprises decreasing both the salinity and concentration of solubilizing co-surfactant of the surfactant fluid from a value at the leading edge of the surfactant fluid at which the salinity is from 50 to 150 percent of the salinity of the water present in the subterranean formation, to a final value at the trailing edge of the surfactant fluid at which the salinity is from 75 to 300 percent of the salinity of the hydrophilic polymer-containing fluid, and maintaining the concentration of solubilizing co-surfactant at a value which is at least sufficient to render the petroleum sulfonate partially soluble in the fluid at the salinity of each portion of the surfactant fluid.

2. A method as recited in claim 1 where the solubilizing co-surfactant is an ethoxylated and sulfonated surfactant of the following formula:

$$RO(R'O)_nR''SO_3^-X^+$$

wherein R is a $C_8$ to $C_{20}$ alkyl group or alkylaryl group comprising benzene, toluene or xylene having attached thereto at least one $C_6$ to $C_{18}$ alkyl group, R' is ethylene or a mixture of ethylene and propylene or higher alkylene with relatively more ethylene than propylene, n is a number from 2 to 12 representing the average number of alkylene oxide units, R" is ethylene, propylene, hydroxypropylene or butylene, S is sulfur, O is oxygen and X is a monovalent cation selected from the group consisting of sodium, potassium, lithium, or ammonium.

3. A method as recited in claim 1 wherein R is a $C_{12}$ to $C_{18}$ alkyl.

4. A method as recited in claim 2 wherein R is benzene, toluene or zylene having attached thereto at least one $C_8$ to $C_{15}$ alkyl.

5. A method as recited in claim 2 wherein R' is ethylene.

6. A method as recited in claim 1 wherein the solubilizing co-surfactant is an ethoxylated and sulfated surfactant having the following formula:

$$RO(R'O)_nSO_3^-M^+$$

wherein R is a $C_8$ to $C_{20}$ alkyl or alkylaryl comprising benzene, toluene or xylene having attached thereto at least one $C_6$ to $C_{18}$ alkyl, R' is ethylene or a mixture of ethylene and higher alkylene with relatively more ethylene than higher alkylene, n is a number from 2 to 12, O is oxygen, S is sulfur and M is sodium, potassium, lithium or ammonium.

7. A method as recited in claim 1 wherein the total volume of surfactant fluid is injected in the form of from two to ten mini-slugs of surfactant, the first slug having salinity about equal to the formation water and the last slug having salinity about equal to the salinity of the polymer fluid, with intermediate slugs being of intermediate salinity values.

8. A method as recited in claim 7 wherein the number of slugs of surfactant fluid is from 2 to 5.

9. A method as recited in claim 1 wherein the salinity is decreased continually from the leading edge value to the trailing edge value, with the concentration of solubilizing co-surfactant being maintained at a value which is at least sufficient to render the petroleum sulfonate partially soluble at each salinity value of the fluid.

10. A method as recited in claim 1 wherein the polymer fluid salinity level is less than 20,000 parts per million total dissolved solids.

11. A method as recited in claim 1 wherein the salinity of the surfactant fluid injected immediately prior to the polymer fluid is from 100 to 150 percent of the salinity of the polymer fluid.

* * * * *